United States Patent Office
3,568,405
Patented Mar. 9, 1971

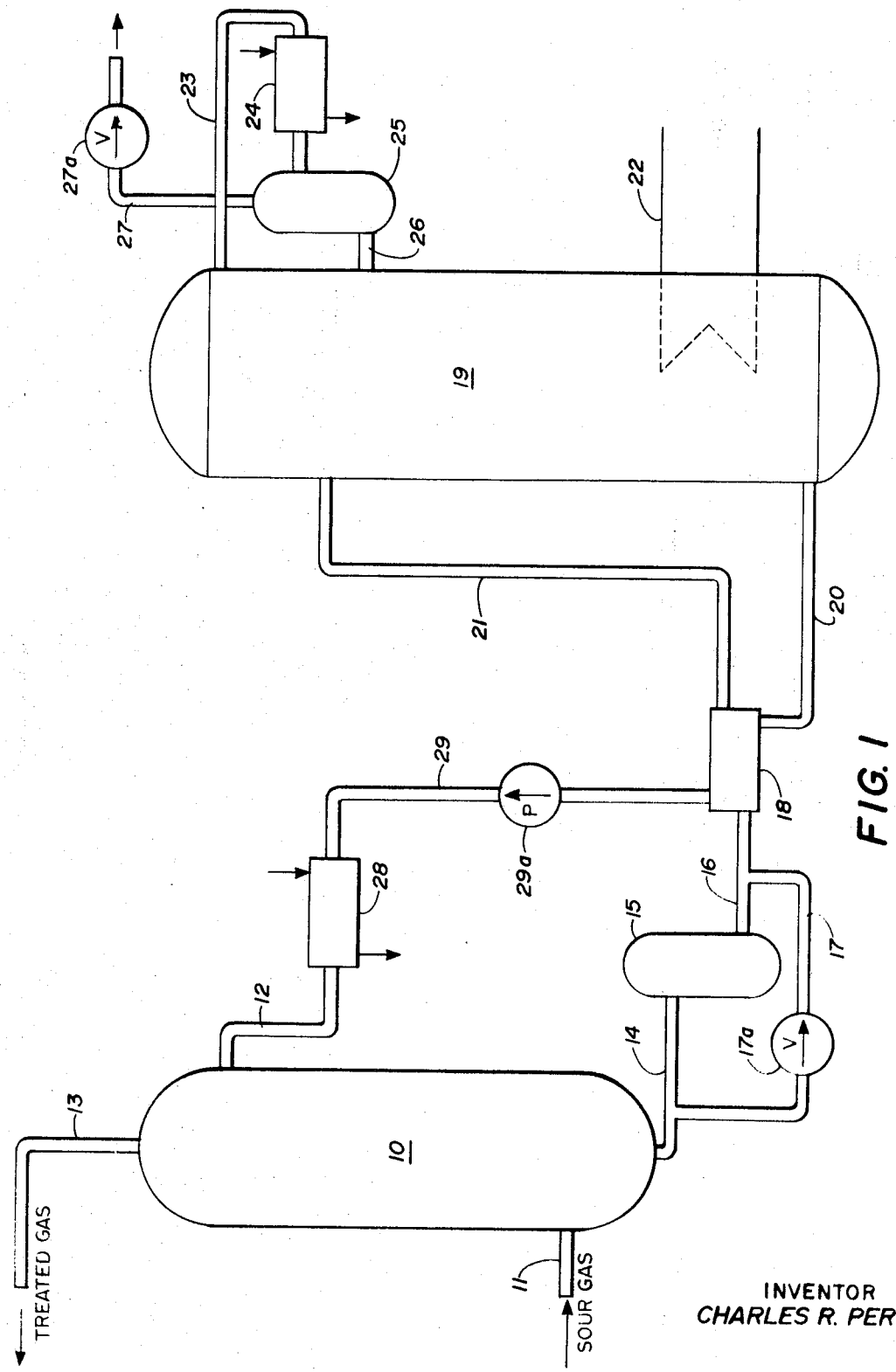
March 9, 1971 — C. R. PERRY — 3,568,405
FILTRATION METHOD AND APPARATUS
Filed May 7, 1969 — 2 Sheets-Sheet 1
FIG. I
INVENTOR
CHARLES R. PERRY
Richards, Harris & Hubbard
ATTORNEY

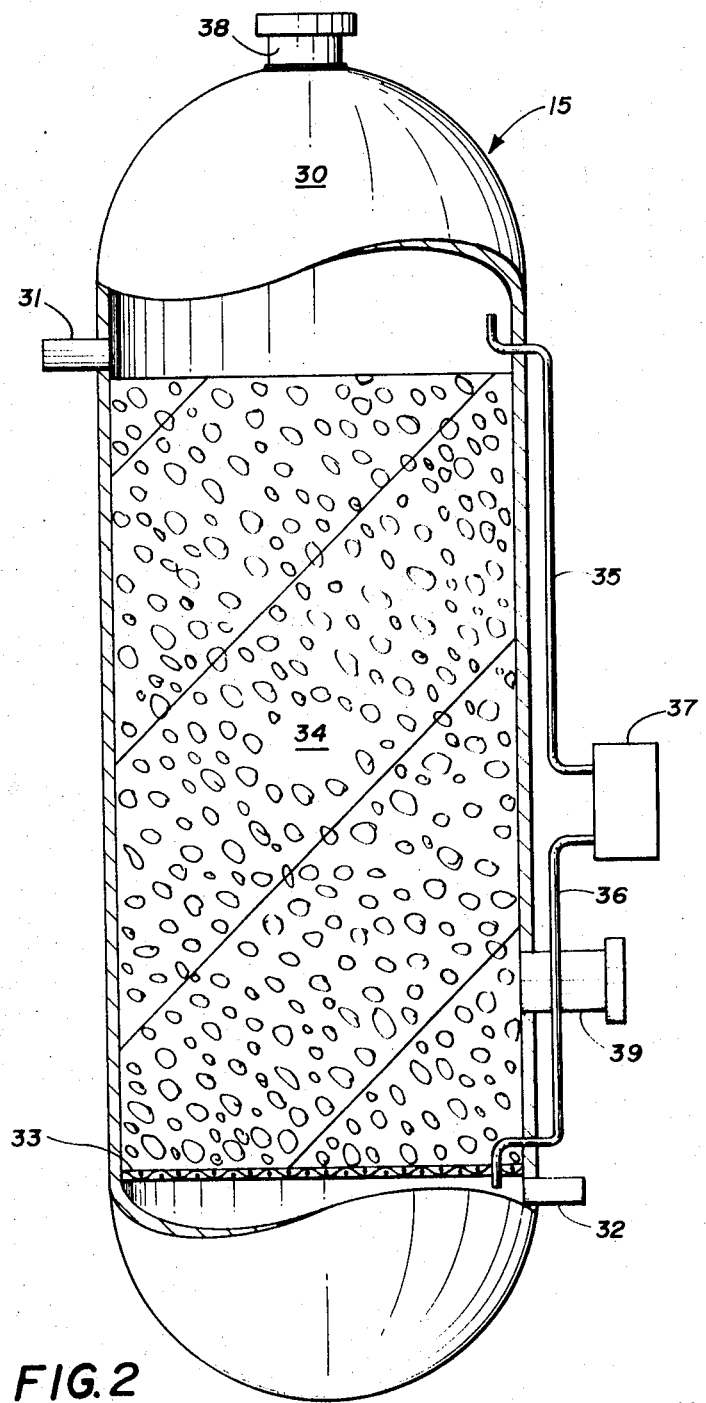

3,568,405
FILTRATION METHOD AND APPARATUS
Charles R. Perry, Odessa, Tex., assignor to Portable Treaters Incorporated, Odessa, Tex.
Filed May 7, 1969, Ser. No. 822,359
Int. Cl. B01d 15/06
U.S. Cl. 55—32    12 Claims

ABSTRACT OF THE DISCLOSURE

Contaminated solutions, such as aqueous amine treating solutions used in the desulfurization of natural gas, are purified by passing the contaminated streams through a filter bed of charcoal particles having sizes generally within the range of No. 2 to No. 12 mesh screen (Tyler), and at a rate of no greater than 4 gallons per minute per cubic foot of filter bed. Preferably, the contaminated stream is passed to the bed at a velocity (relative to the cross sectional area of said bed normal to flow) of no greater than 15 gallons per minute per square foot of filter bed.

---

This invention relates to filtration. In another aspect, this invention relates to a novel method and apparatus for maintaining process treating streams clean and free from contaminants which normally accumulate therein.

In conventional absorption or extraction processes, such as the desulfurization or dehydration of a gaseous hydrocarbon stream, a liquid treating stream contacts the contaminated stream in a suitable contact zone, extracts a specific component or components therefrom, and is then regenerated by removal of the extracted component or components and passed back to the contact zone.

Problems generally occur when practicing these treating processes when contaminants which are not removed by the regeneration process build up in the treating stream. For example, the contaminants found in conventional aqueous streams used in the desulfurization of natural gas include iron sulfide, gilsonite, asphalt, and various liquid hydrocarbons. Contaminants found in conventional aqueous glycol streams used in the dehydration of natural gas, for example, are similar. These contaminants will cause foaming of the solution, corrosion and/or erosion of piping and equipment, scaling, line plugging, incomplete stripping of the fouled solution, and general failure to meet design performance.

Efforts have been made to reduce the concentration of these contaminants by including various side stream filtering devices within the treating solution piping structure. These filter devices include a combination of a mechanical filter to remove solids and a charcoal bed to remove dissolved and entrained liquid hydrocarbons. Others include a filter cake type filter, such as a diatomaceous earth type filter. Still others depend on a combination of a mechanical filter and a side stream total distillation reclaimer.

All these conventional filter devices are satisfactory in removing portions of contaminants from the treating streams. However, no single zone filter system has yet been devised which will result in low capital investment and maintenance costs, a low pressure drop through the filter, and still remove substantially all of the above-described contaminants from treating solution streams.

Therefore, one object of this invention is to provide an improved method and means for removing contaminants from treating streams which will result in more efficient treating operations.

Another object of this invention is to provide a filter design to operate full stream in a chemical processing stream which will remove substantially all of the dissolved and entrained solid contaminants in the stream and produce a negligible pressure drop in the system.

According to the invention contaminants which normally build up in chemical treating streams, such as aqueous amine treating streams, are removed by passing the stream through a filter zone containing particulate charcoal consisting of particles having sizes no larger than that which will pass through a No. 2 mesh Tyler screen and no smaller than that which will be retained in a No. 12 mesh Tyler screen, and a sufficient volume so that the bed space loading of the solution passing through the bed does not exceed 4 gallons per minute per cubic foot of bed. Preferably, the filter bed is a sufficient diameter so that linear velocity of solution passing to the bed will not be greater than 15 gallons per minute per square foot of filter bed.

This invention can be more easily understood from a study of the drawings in which:

FIG. 1 is a schematic flow diagram of a conventional aqueous amine absorption process having the filter means of this invention operatively connected therein; and FIG. 2 is a side elevation view partly in section of the filter unit of this invention.

Now referring to FIG. 1, a typical natural gas desulfurization process is illustrated which utilizes the filtering technique of this invention. This basic process can be utilized for the desulfurization of natural or refinery gases with aqueous amine absorbent solutions, or for the dehydration of natural or refinery gases with aqueous glycol absorbent solutions, or for a combined process for desulfurizing and dehydrating a gas stream with an aqueous amine-gylcol stream. The process which is used for describing a preferred embodiment of this invention will be the desulfurization of a natural gas stream by an aqueous amine absorbent solution, such as an aqueous monoethanolamine or diethanolamine solution.

According to the process illustrated in FIG. 1, a sour natural gas containing substantial amounts of hydrogen sulfide is passed to the lower region of absorption tower 10 via conduit 11. Absorption tower 10 can be any conventional absorption tower known in the art, for example, a multi-plate absorption tower. An aqueous amine stream, such as for example, an aqueous stream containing about 5 to 14 weight percent of monoethanolamine is passed to the upper region of absorption tower 10 via conduit 12. The gas passing upwardly through absorption tower 10 is counter-currently contacted by the aqueous amine stream causing a reaction between the hydrogen sulfide and the amine as follows:

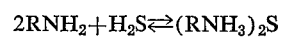

Thus, the gas stream leaving absorber 10 via conduit 13 will be substantially free of hydrogen sulfide whereas the absorbent solution stream leaving the lower end of absorber 10 via conduit 14 will be rich in absorbed hydrogen sulfide.

The rich solution stream will pass from conduit 14 to filter device 15, and will be treated according to the process of this invention and then removed via conduit 16. The filter treating method of this invention will be described in detail below. It is preferred that solution from conduit 14 not be allowed to pass through conduit 17 into conduit 16 during normal operation. Thus, preferably, it is only when filter device 15 is being loaded with charcoal, or reactivated by steam treatment, for example, that valve 17a will be opened to allow solution to pass from conduit 14 directly onto conduit 16 via conduit 17 and valve 17a.

The filtered solution from conduit 16 is passed through heat exchanger 18 whrein it is warmed in indirect heat exchange contact by fluid passing from the lower region of reactivator 19 via conduit 20. The warmed rich solution is then passed to the mid-section of reactivator 19 via conduit 21. Reactivator 19 can be any suitable type reactivator such as multi-tray fractionation zone which is heated by a suitable device, for example, heating coil 22. The solution passing through reactivator 19 is thereby heated to cause the above-described reaction to reverse to form the amine plus hydrogen sulfide. The hydrogen sulfide rises up reactivator 19 and is removed therefrom by conduit 23. All of the hydrogen sulfide and some steam is removed by conduit 23 and passed through cooler 24 wherein the steam is condensed. The resulting hydrogen sulfide-$H_2O$ steam is passed to separator 25. Water is recycled to the upper region of reactivator 19 via conduit 26 as reflux. Hydrogen sulfide is separated from the condensed water, and vented through conduit 27 and a vent valve 27a to a flare, or sulfur recovery unit.

The reactivated amine solution is then passed through heat exchanger 18 as described above, and from heat exchanger 18 to cooler 28 via conduit 29 and pump 29a. Coolers 24 and 28 can be any conventional cooling devices, such as, shell-and-tube type heat exchange devices which use a suitable coolant, such as cooling water. The cool aqueous amine solution from cooler 28 is again passed to the upper region of absorption tower 10 via conduit 12 to thereby complete the cyclic absorption-reactivation process.

In addition to removing the hydrogen sulfide from the sour gas stream in the manner described above, the aqueous amine absorbent stream also collects various other contaminants which cannot be removed from the absorbent stream by reactivator 19. These contaminants include various small particles generally between 1 and 25 microns in diameter of iron sulfide, sand, gilsonite, carbon, asphalt, and the like, and various entrained and dissolved liquid hydrocarbons. The entrained solids content for most operations is generally in the range of 0.5 to 1 weight percent of the aqueous absorbent stream, and the entrained and dissolved liquid hydrocarbons are generally about 0.5 weight percent of the aqueous solution. It is essential that these contaminants be removed from the absorbent stream because their presence will result in inefficient operation due to foaming of the solution, corrosion, scaling, and plugging of the equipment, and incomplete stripping of the fouled aqueous amine solution.

Conventional sock type filters can generally reduce the solids content to values between 0.02 and 0.18 weight percent of the solution. However, these sock type filters will not remove the dissolved and entrained hydrocarbons. Therefore, conventional charcoal type filters have been used in combination with the sock filters to effect the removal both of the particulate matter and the entrained and dissolved liquid matter. Alternatively very expensive diatomaceous earth type filters have been used. It was unexpectedly found that when using the charcoal filter device and technique of this invention, the solids content of the solution is reduced to a value of less than 0.01 percent, and 99+% of the dissolved and entrained hydrocarbons are removed.

Thus, when utilizing the filter of this invention the entire absorbent stream can be continuously directed to the filter to yield a clean water white solution with a pressure drop through the filter of less than 5 p.s.i. Referring to FIG. 2, filter unit 15 (FIG. 1) generally comprises an enclosed elongated cylindrical body 30 carrying an inlet conduit 31 which is adapted to communicate with a suitable conduit such as conduit 14 (FIG. 1), and an outlet conduit 32 which is adapted to communicate with a suitable outlet conduit such as 16 (FIG. 1). Charcoal bed support grate 33 is operatively positioned adjacent the lower end of cylindrical body 30 and is designed to carry charcoal bed 34 but allow fluid communication between bed 34 and outlet conduit 32. Differential pressure sensing conduits 35 and 36 communicate with the spaces above and below charcoal bed 34, respectively, and communitcate with the differential pressure gauge means 37. As illustrated, conduit 38 positioned at the top of cylindrical body 30 is utilized to fill filter 15 (FIG. 1) with the charcoal filter material and conduit 39 is utilized to remove the charcoal from filter 15 (FIG. 1) after it has become fouled.

Charcoal bed 34 generally comprises a bed of substantially uniform cross-sectional area and consists of particles which are no smaller than that retained on a No. 12 Tyler screen mesh and no larger than that passing through a No. 2 Tyler screen mesh. Preferably, the distribution of particle sizes within charcoal bed 34 should not fall outside 4 to 10 Tyler screen mesh, and more preferably, 4 to 6, or 6 to 8 Tyler screen mesh.

Any suitable type charcoal including coal base and wood base charcoal can be used in the practice of this invention. For example, coal base charcoal having a bulk density of 50 pounds per cubic foot, and wood base charcoal having a bulk density of 16 pounds per cubic foot, have been used successfully in the practice of this invention.

Additionally, charcoal should be present in sufficient quantity such that the bed space loadings of fluid flowing through charcoal filter 15 (FIG. 1) do not exceed 4 gallons per minute per cubic foot of bed. Preferably, the bed space loading should be about 2 gallons per minute per cubic foot of bed.

Unexpectedly superior removal of both solid and liquid contaminants from amine streams has been accomplished when in addition to the maximum bed space loading described above, the vessel and bed diameter are sized to limit the linear velocity of fluid flowing through filter bed 34 to a maximum of 15 gallons per minute per square foot of bed (cross sectional area normal to the flow path). Preferably, the linear velocity should be no greater than 12 gallons per minute per square foot, and the most preferred linear velocity is about 10 gallons per minute per square foot of bed. When using this criteria in conjunction with the maximum bed space loading referred to above, the minimum bed depth is about three feet.

Thus, it has been found that when the criteria referred to above is used to design the charcoal bed filter, the filter can be connected full stream in the process, and substantially all of the entrained particulate matter and dissolved and entrained hydrocarbon liquid matter will be removed to yield a water white solution. It is noted that filter 15 can be installed either on the rich solution stream as illustrated in FIG. 1, or within conduit 12 to act upon the lean solution stream. In some operations, it may be desirable to utilize two filters, one on the rich solution stream, and the other on the lean solution stream. It is preferred to operate the filter device of this invention at or near ambient temperatures to increase its capacity for removal of hydrocarbons.

In most operations the average bed life of a charcoal filter used according to this invention is from six to 12 months. However, conventional washing and/or steaming revivication operations can be used to substantially rid the bed of contaminating material and prepare it for further re-use. The pressure drop across a new bed as determined by differential pressure gauge means 37 is generally less than 5 p.s.i., usually from 2 to 3 p.s.i. The bed can be used effectively until the pressure drop across the bed reaches about 15 p.s.i. At this time, revivication operations can be utilized, or if desired, the bed can be dumped and a new bed added to device 15.

This invention can be more easily understood from a study of the following example.

EXAMPLE

An aqueous amine plant similar to the one illustrated in FIG. 1, containing the filter device 15 of this invention, is operated to remove contaminating amounts of hydrogen sulfide from a natural gas stream. Typical operating conditions of the amine absorber plant are as follows:

| | |
|---|---|
| Gas rate, million standard cubic feet per day | 8.0 |
| Gas temperature, °F. | 74 |
| Absorber pressure, pounds per square inch | 400 |
| Gas inlet $H_2S$ content, grains per hundred standard cubic feet | 165 |
| Amine absorber solution rate, gallons per minute | 22.5 |
| Amine content (weight percent monoethanolamine) | 5.5 |
| $H_2S$ content of lean amine solution, grains per gallon | 34 |
| $H_2S$ content of rich amine solution, grains per gallon | 490 |
| Temperature of amine solution entering absorber, °F. | 93 |
| Temperature of amine solution leaving absorber, °F. | 82 |
| Contaminant solids content leaving conduit 14, weight percent | 0.1 |
| Dissolved and entrained contaminant hydrocarbons leaving conduit 14, weight percent | 0.05 |
| Temperature of amine solution entering reactivator, °F. | 82 |
| Reactivator pressure, pounds per square inch | 1 |
| Temperature of solution leaving reactivator, °F. | 215 |

In this particular example, filter bed 34 of filter 15 comprises 4 to 10 mesh wood base charcoal having a density of 16 pounds per cubic foot. The diameter of the filter bed is 2.0 feet and the bed depth is 5.0 feet. With this design the rich solution from conduit 14 passes to filter bed 34 at a rate of 7.6 gallons per minute per square foot of bed, and the space loading rate of filter 15 is 1.5 gallons per minute per cubic foot of bed. With this operation it is found that the normal contaminant solids content of iron sulfide, sand, gilsonite, carbon, asphalt, and the like, is less than 0.01% by weight of the amine absorbent solution passing to conduit 16 from filter 15. Additionally, the solution is water white and contains substantially no dissolved or entrained hydrocarbons.

The above example illustrates a preferred embodiment of this invention wherein contaminants are removed from a process stream by a charcoal filter consisting of particulate charcoal sized so that no particles are smaller than that retained on a No. 12 Tyler screen mesh and no larger than that which will pass through a No. 2 Tyler screen mesh, wherein the bed space loading of the solution passing through the filter is no greater than 4 gallons per minute per cubic food of bed, and wherein the linear velocity of the solution passing to the filter bed is no greater than 15 gallons per minute per square foot of bed. This example is not intended to limit the scope of this invention to the three criteria, i.e., charcoal size, bed space loading, and linear velocity.

Unexpectedly high filtration efficiencies for removing both particulate and dissolved or entrained liquid contaminants from process streams are obtained when using the charcoal filter of this invention having a particle bed with the recited particle sizes, and a solution bed space loading of no greater than 4 gallons per minute per cubic foot of bed. Superior filtration efficiencies result when additionally utilizing linear velocities of no greater than 15 gallons per minute per square foot of cross sectional area of the bed.

Thus, it is apparent, that this invention has been particularly described in detail with reference to its preferred embodiments, and many modifications will now be apparent to those skilled in the art upon reading the specification.

What is claimed is:

1. A method of removing contaminants selected from dissolved liquids and entrained liquids and solids from a chemical process stream comprising passing said stream through a bed of charcoal consisting of particles having sizes no larger than that which will pass through a No. 2 mesh Tyler screen, and no smaller than that which will be retained on a No. 12 mesh Tyler screen said stream being passed through said bed at a rate of no greater than 4 gallons per minute per cubic feet of said bed.

2. The method of claim 1 wherein said stream is passed to said bed at a linear velocity (relative to the cross sectional area of said bed normal to flow) of no greater than 15 gallons per minute per square foot of bed.

3. The method of claim 1 wherein said stream is an aqueous amine absorbent stream used in the disulfurization of vaporous hydrocarbons.

4. The method of claim 1 wherein said stream is an aqueous glycol stream used in the dehydration of vaporous hydrocarbons.

5. The method of claim 1 wherein said contaminants are selected from materials which include liquid hydrocarbon, entrained hydrocarbon and solid particulate material selected from iron sulfide, sand, gilsonite, carbon, and asphalt.

6. In a process wherein an absorbent stream is passed in successive cyclic manner first to a contacting zone wherein it contacts a chemical stream and removes at least one component therefrom and secondly through a reactivation zone wherein said component is removed from said absorbent stream and thirdly wherein said absorbent stream is passed back to said contacting zone, the improvement comprising; removing contaminating impurities from said absorbent stream selected from dissolved liquids and entrained liquids and solids by passing said absorbent stream through a bed of charcoal consisting of particles having sizes which are no larger than that which will pass through a No. 2 mesh Tyler screen, and no smaller than that which will be retained on a No. 12 mesh Tyler screen, and wherein said absorbent stream is passed through said filter at a rate of no greater than 4 gallons per minute per cubic feet of said bed.

7. The method of claim 6 wherein said absorbent stream is passed to said bed at a linear velocity (relative to the cross sectional area of said bed normal to flow) of no greater than 15 gallons per minute per square foot of said bed.

8. The method of claim 6 wherein said absorbent stream is an aqueous amine stream, and said chemical stream is a hydrocarbon stream containing hydrogen sulfide.

9. The method of claim 6 wherein said absorbent stream is an aqueous glycol stream and said chemical stream is a vaporous hydrocarbon stream containing water vapor.

10. The method of claim 6 wherein said contaminants are selected from materials which include liquid hydrocarbon, entrained hydrocarbon and solid particulate material selected from iron sulfide, sand, gilsonite, carbon, and asphalt.

11. A filter means for removing contaminants selected from dissolved liquids, entrained liquids, and entrained solids from a liquid stream comprising:

an elongated vessel having an inlet and an outlet adjacent opposite ends thereof, a bed of particulate charcoal disposed within said vessel having particles of size no larger than that which will pass through a No. 2 mesh Tyler screen, and no smaller than that which will be retained on a No. 12 mesh Tyler screen, said bed being of such volume that the bed space loading of a liquid passing through said vessel from inlet to outlet thereof is no greater than 4 gallons per minute per cubic feet of said bed.

12. The apparatus of claim 11 wherein the diameter of said chamber and said bed is such that liquid passing through said bed from said inlet will be at a linear velocity relative to the cross sectional area of said bed of no more than 15 gallons per minute per square foot.

References Cited

UNITED STATES PATENTS

| | | | |
|---|---|---|---|
| 2,988,171 | 3/1961 | Arnold et al. | 55—32 |
| 3,108,855 | 10/1963 | Moore | 55—73X |
| 3,436,344 | 4/1969 | Canning et al. | 210—39 |

JAMES L. DE CESARE, Primary Examiner

U.S. Cl. X.R.

55—73; 210—39